(12) United States Patent
Appel (10) Patent No.: US 8,065,621 B2
(45) Date of Patent: Nov. 22, 2011

(54) SYSTEM AND METHOD FOR GRAPHICAL CREATION, EDITING AND PRESENTATION OF SCENARIOS

(76) Inventor: Zvi Appel, Haifu (IL)

( * ) Notice: Subject to any disclaimer, the term of this patent is extended or adjusted under 35 U.S.C. 154(b) by 1123 days.

(21) Appl. No.: 11/834,767

(22) Filed: Aug. 7, 2007

(65) Prior Publication Data
US 2009/0043802 A1    Feb. 12, 2009

(51) Int. Cl.
*G06F 3/00* (2006.01)
(52) U.S. Cl. ........ 715/762; 715/764; 715/723; 715/724; 715/725; 715/726
(58) Field of Classification Search .................. 715/762, 715/764
See application file for complete search history.

(56) References Cited

U.S. PATENT DOCUMENTS

| | | | |
|---|---|---|---|
| 5,893,074 A | 4/1999 | Hughes et al. | |
| 5,999,911 A * | 12/1999 | Berg et al. | ......................... 705/9 |
| 6,810,383 B1 | 10/2004 | Loveland | |
| 2004/0199369 A1 | 10/2004 | Freidman et al. | |

FOREIGN PATENT DOCUMENTS

| | | |
|---|---|---|
| EP | 1650700 | 4/2006 |
| WO | WO2006055803 | 5/2006 |

* cited by examiner

*Primary Examiner* — William L Bashore
*Assistant Examiner* — Daniel Um
(74) *Attorney, Agent, or Firm* — Browdy and Neimark, PLLC (57) ABSTRACT

The present invention discloses a system and a method for creating, editing, reusing and presenting of scenarios. The scenario may comprise events, where each event nay comprise instance and/or class components. The system may comprise a processor and a GUI that is object oriented. The GUI may allow a user to graphically edit, create and define operations upon scenarios, events and events' components; and static and dynamic presentations of the scenario, the events that are associated with the scenario and the events' components. The processor may enable translating the graphical operations into programming code to be executed by a computer. The system may enable a multiplicity of users to reuse and customize template scenarios where upon downloading a template scenario the system may replace all the instance components with their associated class components.

13 Claims, 10 Drawing Sheets

SYSTEM AND METHOD FOR GRAPHICAL CREATION, EDITING AND PRESENTATION OF SCENARIOS

FIELD OF THE INVENTION

The present invention relates generally to the field of software applications. More particularly, the present invention relates to the field of software applications for scenario management.

BACKGROUND OF THE INVENTION

More and more users use software solutions for various types of processes and scenario management. Some processes may be complex and involve a multiplicity of actions, events, people, a multiplicity of services' providers, participants, tools, materials and the like.

A patent number WO2006055803, by Kulatilake Siranjana discloses a system for projects management, where the GUI provides a plurality of selectable project-parameters. The user may select parameters from a plurality of object parameters and display the objects chronologically.

A patent number U.S. Pat. No. 5,999,911, by Berg William C. and Newman Reynaldo W. Discloses a method and a system for managing of workflows. The workflows include a number of steps having step encapsulations and dependency relationships.

Although the two above patent applications disclose methods or systems for representing of project related parameters in a time-schedule representation that associates the objects or tasks to the time frame and to the projects and the projects parameters—none of the above patents and patent applications discloses a graphical operation, creating and managing of the parameters, where the tasks and/or the scenarios are reusable and may be distributed by users, created by users and/or downloaded as templates. Furthermore, none of the applications above discloses a system or a method that includes a dynamic graphical representation of the relation between the scenario's or processes parameters and objects— where the tasks relating to the same project are presented in a movie-view.

Moreover, the above patents and patent applications do not relate to sharing of informative data between users and do not allow users to customize templates.

A patent number US2004199369, by Freidman Jonathan Michael and Fishman Flynn Devynn discloses a time-based modeling system and method that comprises a graphical user interface (GUI) that enables displaying of time-related properties selectable by the user. Additionally, Freidman and Fishman's application discloses an optional feature that allows the user to investigate changes to the model and directly view the results of the changes that were made.

Although Freidman and Fishman's application enables the users to view selected properties in a graphical presentation as well as changes made in the model, Freidman and Fishman's application does not allow a dynamic graphical presentation of the entire flow of the model, and/or sharing of properties and services between users.

A patent number U.S. Pat. No. 5,893,074, by Hughes Michael and Gira Glen discloses a network based task management system where each task involves a contract between a supplier and a receiver, and results in production of a "products". The suppliers as well as the receivers can enter data concerning of products.

Additionally, a patent number U.S. Pat. No. 6,810,383, by Loveland James B, discloses an automated task management and evaluation system that allows a remote access to interested parties, such as services providers, to perform estimates or to bid on projects.

Although Hughes and Gira's as well as Loveland's patent applications disclose tasking systems that allow sharing of databases that relate to providers of services according to the activity type selected by the users—their applications do not disclose dynamic or static graphical management operation or representation of the providers of services and/or of the tasks that relate to the project along the timeframe. Meaning that to create or edit a template the user uses graphical tools that can be translated into operational functions of the computer.

Hughes and Gira's as well as Loveland's patent applications do not disclose systems that include GUI options that allow the user to create manage and view a project and its tasks graphically. Moreover, Hughes and Gira's as well as Loveland's patent applications do not disclose systems that allow saving or sharing templates of projects or tasks.

A patent number EP1650700, by Hatoun George E. and Aziz Imran discloses a system that allows users to create templates of workflows and to turn a template into an actual procedure. However, Hatoun and Imran's system does not include graphical icons and tools by which the project workflow is performed, created or presented. Moreover, the presentation of the workflow is static and does not include a dynamic presentation of the flow. Additionally Hatoun and Imran's system does not allow reuse of objects and components of the workflow and/or sharing of said objects in an object oriented design.

SUMMARY OF THE INVENTION

The present invention is targeted at facilitating unprofessional users with no technical knowledge to create, operate and share scenario related information and enable services providers, vendors and suppliers to communicate and reach audiences that relate to operations that are associated with their services and/or goods.

The present invention enables an easy and simple managing of scenarios through reusable scenarios and scenarios' features that can be customized by the users. The users may be enabled to share a multiplicity of experiences, sources of information, services and suppliers, planning techniques or any other scenario that can be shared.

Additionally, the system disclosed in this invention may allow simultaneous and correlated handling of a multiplicity of operations and using of existing communication technologies for distributions of scenarios' related information to a multiplicity of users and sources of interests.

The present invention is a novel system and a method for "processes design by images" enabling a user to graphically create, edit, customize and present as well as to execute at least one scenario, where the scenario may comprise events and events' components, such as; participants, tools, input, products and the like. The system may be a web application or also a stand-alone application that may comprise a processor and an object oriented based graphical user interface (GUI). The GUI may provide graphical tools to define, edit and present the events associated with a scenario and the inter-relations between the events within a timeframe of their associated scenario.

An event may be any kind of scenario-related object such as a task, an activity, an operation, a project and the like that may be defined and/or titled by an "action".

The user may graphically define the inter-relations between events where, for example, an event can be defined as dependent upon a previous event to be completed before starting.

The system may enable a multiplicity of users to reuse and customize template scenarios where upon uploading a template scenario the system may replace all the instance components with class components allowing the user to customize the components by selecting instance components associated with the template classes.

The static presentation of a scenario—meaning the presentation of events chronologically within the scenario's timeframe is defined herein as the scenario-flow. The user may place, create or selected events according to a certain chronological sequence on a "design board" which may be a GUI tool that allows viewing the scenario's events along a timescale.

The dynamic presentation of a scenario—meaning the presentation of events of a scenario in a movie like presentation according to the sequence of the scenario is defined hereinafter as the movie-view.

According to embodiments of the present invention, the event may be composed of "components" which may be objects that the user may set to determine the details of the event, according to predefined objects. For example, the components defined in the system may be "action" that may he the title or definition of the event; participants people and/or software services required to carry out the event; tools required to carry out the event, the materials required as input or product definition and the like. The user may be enabled to set at least some of the event's components in a graphical manner. By graphically setting and arranging the components within the event and the events within the scenario's timeframe the system may perform operative functions, by translating the graphical arrangement of the objects of a scenario into computer code and creating interrelations between components, events and the like—represented by graphical symbols, positioning within the timeframe and events.

The scenario, the events and the events' components may be reusable, meaning that the user may create a template scenario, event and the like, download template objects of any kind, customize downloaded templates by, for example, adding his/her own components, events or by changing the positions of the object within the timeframe etc.

According to embodiments of the invention, the system may allow the user to create, define and store events' components as instance components and or as class components, where the class components represent the group of specific components grouped under a common subject defined by the system or by the user. For example, tools' class components where one tools' class is "dishes", another tools' class is "furniture" and the like. The specific tools of, for example, the dishes class may be specific set of plates, specific set of glasses etc.

The user may use predefined classes and specific components to build and create a scenario or an event or to customize a template scenario by, for example, dragging a specific component out of a predefined toolbar that includes drag-and-drop options onto the design board.

According to some embodiments of the present invention, the GUI may comprise:

- a static module that may enable static presentation of the scenario, the events that are associated with the scenario and the events' components;
- a dynamic presentation module that may enable a dynamic presentation (movie view) of the scenario, the events and the inter-relations between the events of the scenario; and
- an operation module that may allow the user to graphically perform operation such as: creating, editing, defining, deleting and managing of scenarios, events, components as well as graphically setting of the inter-relations between the events of a scenario by, for example placing of graphical objects within a timeframe.

The processor may enable translating the (graphically performed) operations of the user into programming code to allow these operations to be performed by a computer. For example, executing a notification to the user/participant regarding an approaching due date of an event, shifting start dates of dependent events when a previous event is completed and the like and additionally to allow the application to perform rescheduling of events according to resources availability.

According to some embodiments of the present invention, the software application may be connected through the internet, for example, to a web server that may connect to at least one shared database. Connecting to a web server and at least one shared database may allow a multiplicity of users to use template scenarios, to share event classes and specific components and objects, etc. For example a shared wedding plan template scenario that comprises template events such as "book catering", "buy a wedding dress" etc. The wedding plan template may further allow the users to access data relating to catering services as specific components, dresses designers etc.

Additionally, the system may further allow presenting, executing and editing of a multiplicity of scenarios that may be displayed and run where at least some of the event's schedules overlap.

BRIEF DESCRIPTIONS OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein.

The drawings together with the description make apparent to those skilled in the art how the invention may be embodied in practice.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

DETAILED DESCRIPTIONS OF SOME EMBODIMENTS OF THE INVENTION

The present invention discloses a system and a method for graphically creating, managing and presenting of at least one scenario 60, where the scenario 60 may be reusable and may comprise events 110. The system may be a client or a web application 101 that may comprise a processor, a database 30 and an object oriented based graphical user interface (GUI) 10. An event 110 may be any assignment that may be set by the user and/or by the system.

The processor 30 may translate the user's events' definitions over a predefined timeframe into programming code and the GUI 10 may allow static as well as dynamic graphical tools to graphically define, present, compare, manage, execute and edit the events 110 associated with the scenario 60 and define the inter-relations between the events 110 along the timeframe.

According to some embodiments of the present invention, graphic objects such as icons, images, animated and video short films and the like may represent the events 110 of a scenario 60. Each event 110 may comprise components that may be, for example, features of the event 110 and/or people, services, suppliers or tools required for the event 110. The components may too be represented by graphic objects such as, for example, icons, pictures, images and the like.

According to some embodiments of the present invention, a component may be classified by one of two object oriented classification types: "class type" or "instance type". The class type is a generic object where the instance is a specific object. A class component may be associated with a multiplicity of instance components and vise versa—an instance component may be associated with a multiplicity of classes. For example, "Danny Gibson" may be an instance component for "plumbers" class—since he is a plumber but may also be a "carpenter"—therefore the specific instance component called "Danny Gibson" may be associated with two classes: "plumbing" and "carpentry".

An instance component is obligatory associated with a class, since the class is the generic definition of an instance. For example, there can be a class for "plumbers" with no specific instance components associated with this class, but a specific instance component such as "Danny Gibson", for example, may be obliged by the system to be linked to a class component.

Additionally, the system may comprise at least one database 20 that may comprise the class components, the instance components, template scenarios 60 and events and other scenario 60 and users' information.

The reusability of the scenarios 60 and events 110 may be defined by the system's ability to allow a user to retrieve a template scenario 60 comprising events 110 and the events' 110 class components to allow the user to customize the template class components by replacing them with instance components that he/she may select from shareable databases.

Figure 1:
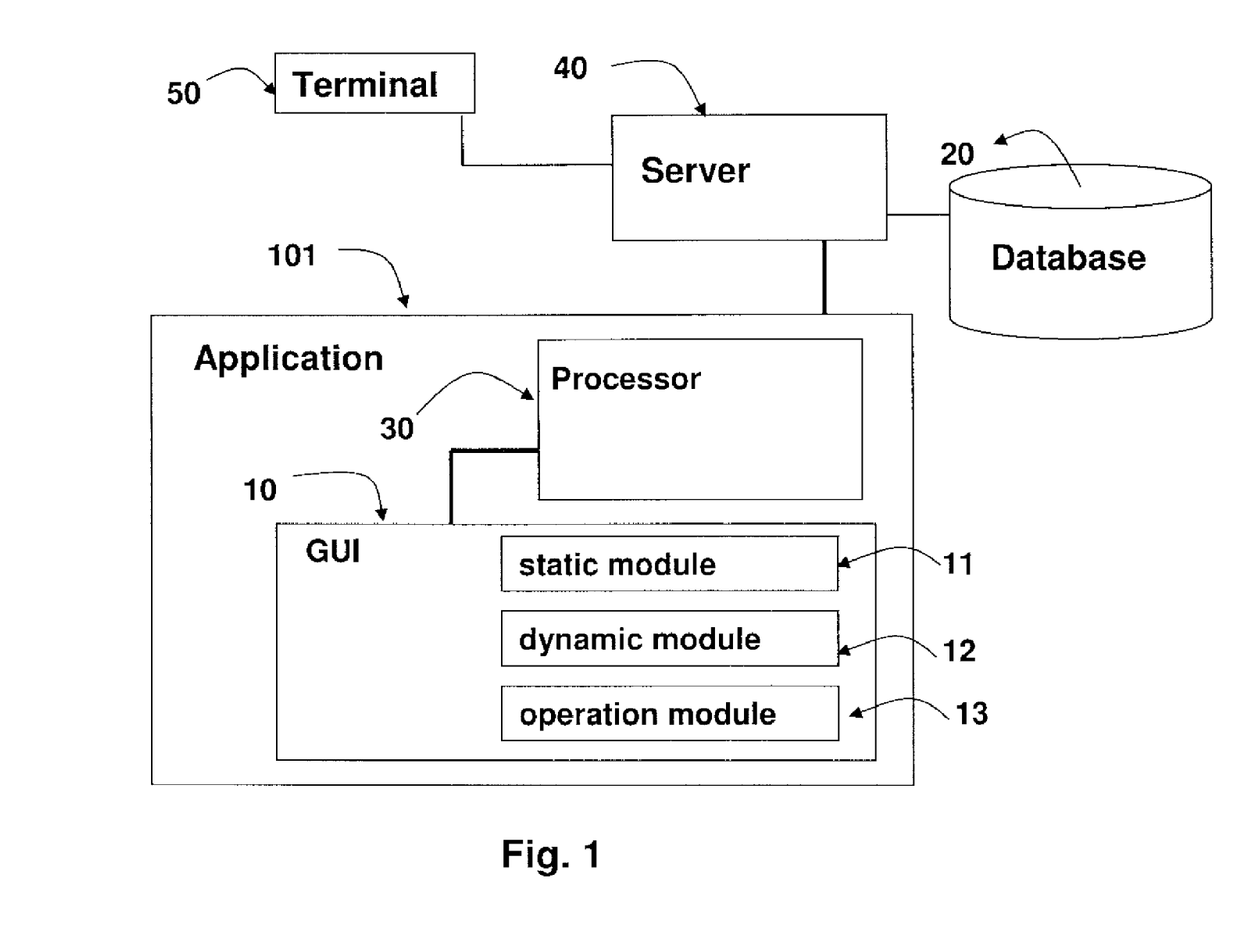
FIG. 1 is a schematic illustration of a system for scenarios management, according to some embodiments of the present invention.

Additionally, the application 101 may be connected to a web-based server 40 that may retrieve data from at least one database 20—to allow the user to share scenarios 60 templates, components and other scenarios' 60 related information, as illustrated in FIG. 1. The server 40 may allow communicating with at least one user's terminal 50 where the terminal 50 may be, for example, a computer, a laptop, a mobile phone that enables connecting to the web and the like. Accordingly, the server 40 may enable communicating with at least one of the communication networks required to communicate with different terminals 50 of users.

According to some embodiments of the present invention, as illustrated in FIG. 1, the GUI 10 may comprise:
- a static module 11—that may allow the user to view a static presentation of at least part of a scenario-flow, and at least one event 110 associated with at least one scenario 60.
- a dynamic nodule 12—that may enable the user to run a dynamic presentation (a movie-view) of the scenario 60, edit the scenario 60 on/off line and view a dynamic presentation (a movie-view) of the edited scenario 60; and
- an operation module 13 that may allow the user to graphically edit, create and define operations upon scenarios 60, events 110 and events' components, by graphically placing of graphical objects within a timeframe on a design board 100; where the processor 30 enables translating the positions of the objects within the timeframe into programming code—to allow the operations to be executed by a computer, according to the graphical and non-graphical definitions of the objects.

Additionally, the application 101 may further enable executing the scenario 60 according to the event's 110 definitions. For example, the application 101 may transmit notification messages to the user, identify availability changes and reschedule the events 110 according to the identified availability of. For example, participants 114 in the event 110 etc.

Additionally, the system may allow identification of availability and availability changes of participants 114, for example, or other instances and rescheduling of said events 110 according to said identified availability.

According to embodiments of the present invention, the events 110 may be inter-related and set according to schedule or chronology, dependency and other relating features. For example, in a wedding scenario 60 the event 110 of "preparing a list of guests" may be set prior to the event 110 of "booking a catering". Once the user graphically inserted the "preparing a list of guests" event 110 left to the "booking a catering" event 110, the chronological inter-relations between the two exemplary events 110 may be defined. The processor 30 may only notify the user regarding the approaching event of "booking a catering" after the event of "preparing a list of guests" is completed.

According to embodiments of the invention, the user may graphically define the inter-relations between events 110 where, for example, an event 110 can be defined as dependent upon a previous event 110 to be completed before starting. Accordingly, once the first event is completed a notification regarding the dependent event 110 may be presented to the user within the scenario 60 presentation and/or by sending messages to the relevant factors through communication commonly known and used channels.

While the description below contains many specifications, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers. The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may he used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or events. The term "method" refers to manners, means, techniques and procedures for accomplishing a given event including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

Figure 2:
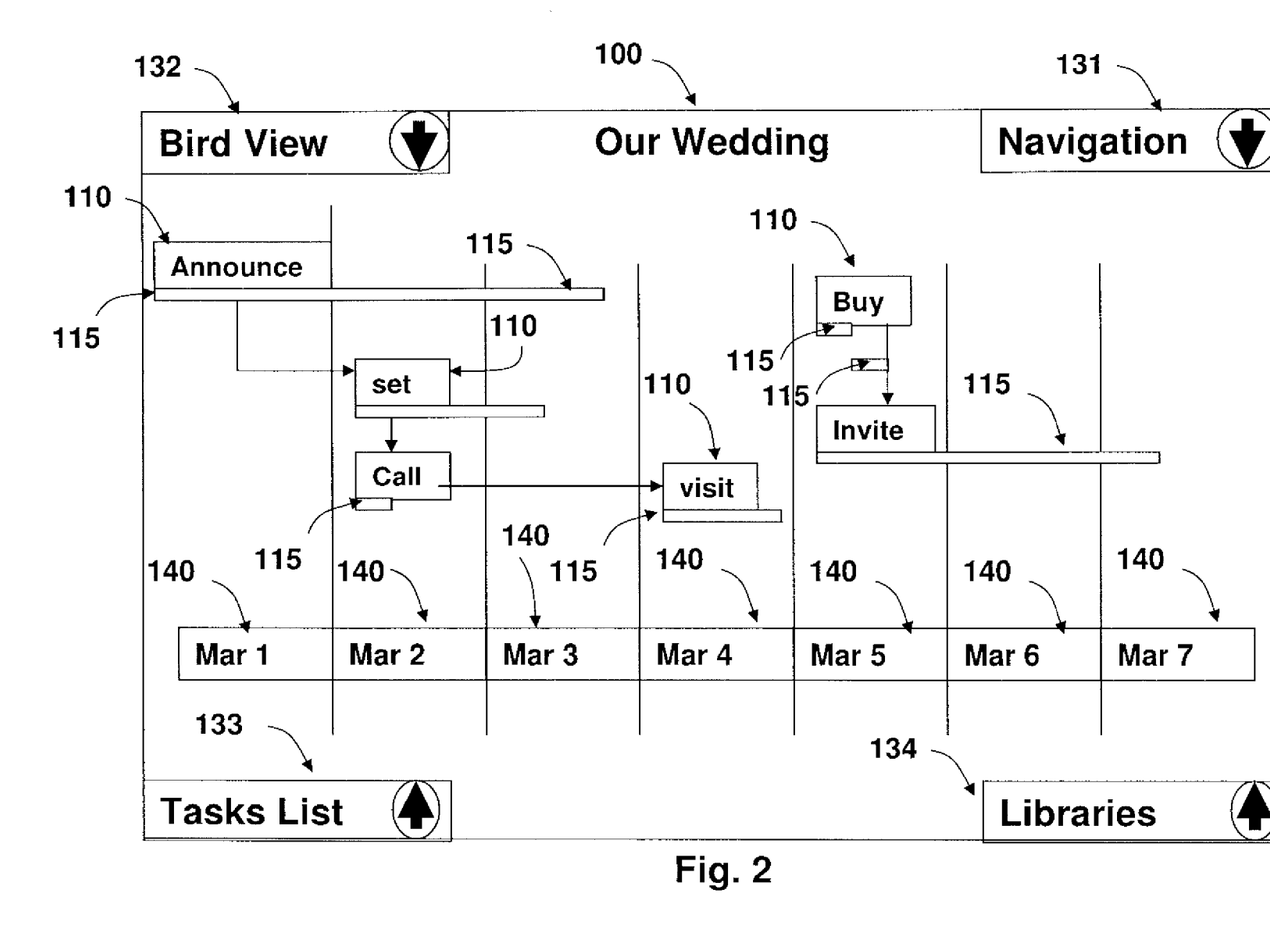
FIG. 2 is a schematic illustration of a scenario-flow representation, according to some embodiments of the present invention.

FIG. 2 schematically illustrates a presentation of a scenario-flow on a display board 100, according to some embodiments of the present invention. Once the user has entered the static module 11 of the GUI 10—the GUI 10 options may allow the user to create a new scenario 60 or upload an existing scenario-flow. The scenario-flow presentation upon the design board 100 may include the events 110 associated with the scenario 60, set over a timeframe (along a timeline) that may exhibit time indicators 140. Each indicator 140 may represent for example, the date, the hour and date, etc. of each event 110. Each event 110 may be graphically positioned according to the date and/or hour the user expects the event 110 to be carried out. Since most events 110 take an interval of time to be carried out, the scenario-flow 100 may enable the user to mark the expected time-duration of the event 110 with a duration-marker 115, as illustrated in FIG. 2.

Additionally, the scenario-flow 100 may allow the user to graphically view, create and edit the parameters and features that the scenario 60 is composed of such as the events' 110 chronology, deadlines, components, and the like.

According to some embodiments of the present invention, the icons that may represent at least some of the parameters and features of the scenario 60 such as the events icons 110, the duration markers 115, etc. may be graphically moved from one position to another and/or from one window to another using drag-and-drop options of the GUI 10 and allow graphical editing of the events 110 and of the scenario-flow.

Additionally, the Design Board may include controllers. The controllers may be scrollbars, collapsing windows that are windows that can open upon the user's mouse click, for example. The controllers may enable the user to select options from a listed bar or may exhibit statistical or calculated parameters regarding the scenario 60 and/or the events 110. For example, as illustrated in FIG. 2, the controllers may be:

Navigation controller 131 that may allow exhibiting a graphical map of the scenario 60 showing all events 110 of the scenario 60 and zooming in and out of the scenario 60 where zooming in allows viewing smaller time intervals within the scenario's 60 timetable and/or smaller parts of the screen; include icons that allow the user to navigate the scenario 60, for example, along the timeframe, and the like.

Bird view controller 132 that may allow the user to view scenario-related parameters such as, for example, the entire duration of the scenario 60, effort, the number of events, the number of participants in the scenario 60 to and the like. The scenario-related parameters may be presented as a list of numbers and/or graphically as charts, for example.

Events list controller 133 that may show a list of all events included in the specific scenario 60, where the events may be indicated, for example, by the title of the event 110.

Figure 4:
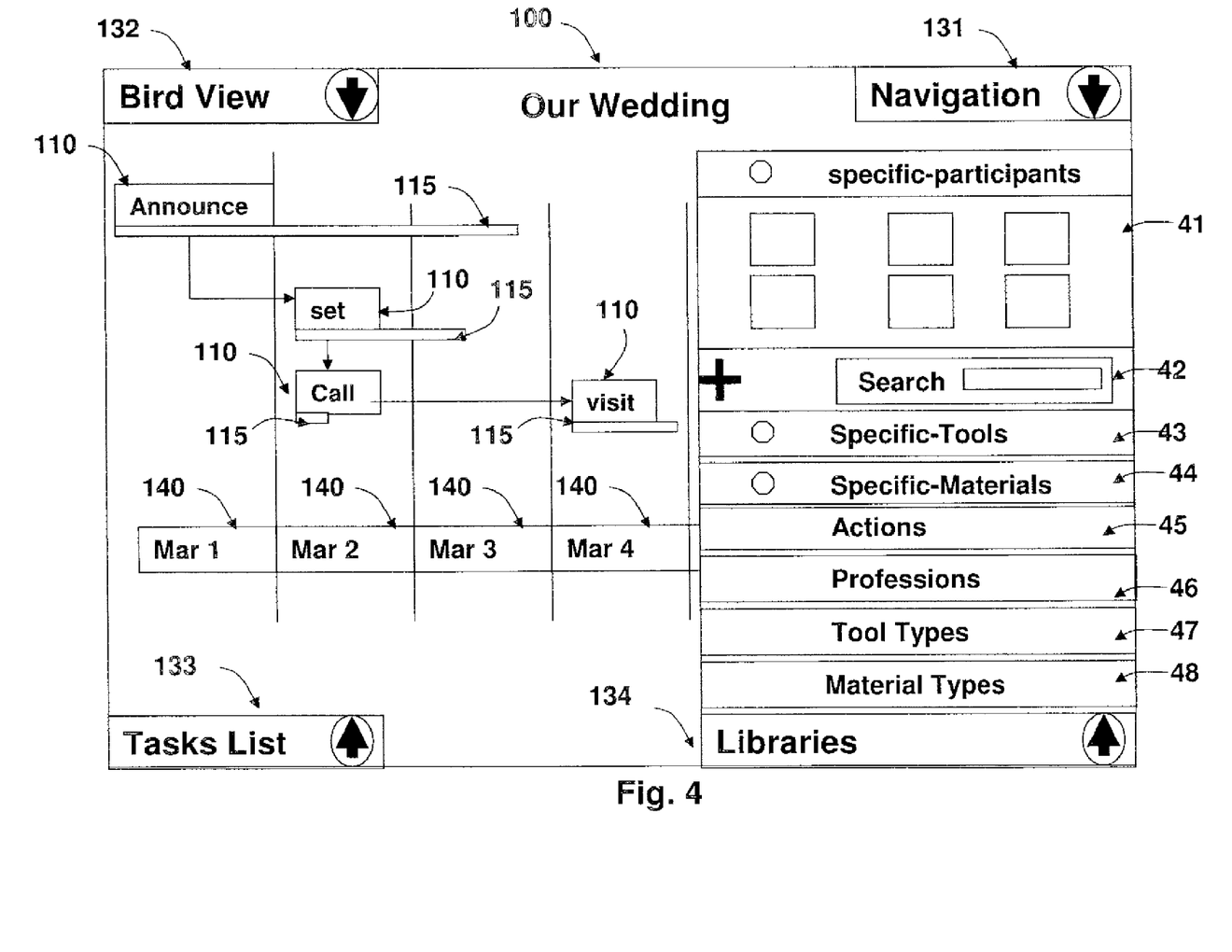
FIG. 4 is a schematic illustration of a libraries controller, according to some embodiments of the present invention.

Libraries controller 134 may be a scrollbar that shows a list of options that may allow the user to select classes and specific components out of predefined drag-and-drop toolbars, as illustrated in FIG. 4.

Figure 3:
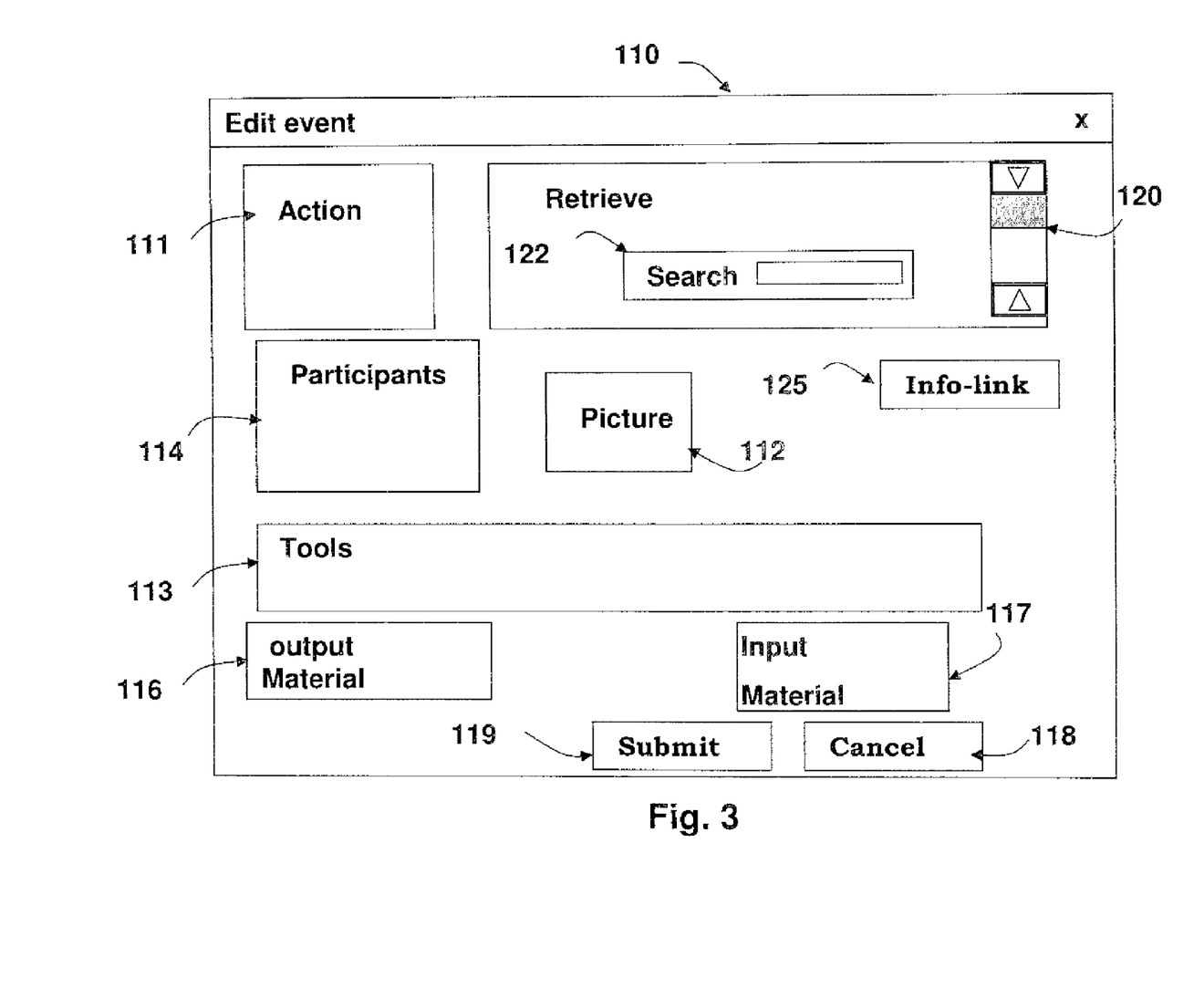
FIG. 3 is a schematic illustration of an event window, according to some embodiments of the present invention.

According to some embodiments of the present invention, the user may create and edit an existing event 110. Editing an existing event 110 may be carried out by clicking upon an icon representing the event 110 in the scenario-flow, for example. Each event 110 may comprise several event-components, as illustrated in FIG. 3, according to some embodiments of the present invention. An event 110 may have obligatory components (meaning that the user has to fill in those components in order to regard the event as an event 110) and non-obligatory components.

According to some embodiments of the present invention, as illustrated in FIG. 3, the event 110 may comprise the following components:

action 111—which may be the event's 110 recommended classes definition, tools—the tools required for the event 110;

input material 117—for example, a list of objects required in the event 110;

output material 116—for example, a list of objects required to be disposed in the event; where the output materials of some of the events 110 may be associated with the input materials of other events 110;

picture 112 or any other image or a visual icon accompanying the action 111;

participants 114 that may be a list of people, companies, services' providers and the like, who participate in the event 110; where the participants 114 may be represented graphically by pictures or icons, for example;

retrieve box 120 that may allow the user to search for 122 and retrieve template scenarios 60, events 110 and/or components info-link 125 enabling to upload info-links 125 such as, for example documents, images, animation or video clips.

Additionally, the event 110 may be submitted of cancelled using submit 119 or cancel 118 buttons respectively.

To better grasp the event's 110 components let us use the example of a "planning a wedding" scenario 60. The events 110 relating to planning a wedding may be for example, booking a place, booking a catering service, booking a photographer, making a list of guests, preparing invitations and verifying guests' arrival. The timeframe of the scenario 60 for performing these events 110 may be, for example, three months from start date to the wedding date. According to this example, the user may put the event 110 of preparing a guests list first—since the number of guest may indicate the size and location of the place, the catering order, invitations and so forth. The event 110 of booking the catering, for example, may include the catering businesses involved (drinks and food) as the participants 114, the input material 117 may be a list of flowers to be placed at the tables and the output materials 116 may be the flowers' disposal packages needed to be disposed once the flowers are set at the tables.

Additionally or alternatively, the planning a wedding scenario 60, for example, may be downloaded as a template scenario 60 comprising of a set of template events 110 sequentially set over the design board 100 where the events 110 may comprise class components allowing the user to position and edit all the scenario's 60 related objects (events and their components). In a template or a non-template situation, once the user have opened the participants 114 component—a preset list of relevant services providers may appear (as a text list and/or graphically) as instance components allowing the user to select a provider out of the list and/or add or use a provider that is not in the preset list. For example, if the event 110 relates to booking a catering service—a list of registered catering businesses may appear in the participants 114 components, where the list may be displayed by advertising icons etc. Additionally, template scenarios 60 and template events 110 may comprise default template filled components such as, for example, preset services providers, tools etc. allowing the user to choose a provider as a participant 114 out of the offered preset list of providers that are registered in the system.

The preset services providers and/or vendors registered as participants 114 may facilitate a business mechanism that may allow businesses relating to template-scenarios 60 to register to the website that provides the sharing of information to users and/or as a way to facilitate the publicity of those providers and vendors.

Additionally or alternatively, users may share lists of services providers, vendors as well as scenario 60 templates and events templates from the database 20 using the web server 40.

Additionally, the user may be enabled to share personal forum-like comments regarding scenario-flows, events 110, specific participants 41 and the like and comment or grade services of registered providers in a predefined website platform, using server 40.

FIG. 4 schematically illustrates the libraries controller 134, according to some embodiments of the present invention. The libraries controller 134 may comprise, for example drag-and-drop options that may allow the user to select events' components and drag them to the scenario-flow on the design board 100.

Additionally, the options may be preset as instance components and/or classes components—where the instance components may allow the user to select a specific participant 41, for example, and drag the selected additional participant out of a predefined list of participants 41 to the scenario-flow.

According to embodiments of the present invention, the instances components may be, for example, according to the exampled components specified, specific participants 41, specific tools 43 and specific materials 44. By selecting and dragging an instance component to the design board 100—a new event 110 may automatically open within the scenario-flow, where at least one of the component related to the added object may be automatically filled.

According to embodiments of the present invention, once an instance component is selected associated with a class (e.g. a specific participant 41 associated with a professions-class 46) a new event 110 may automatically open. The system may allow the user to fill the other un-filled components of the event 110 and may additionally indicate and/or notify the user regarding the un-filled components.

According to some embodiments of the present invention, class components may be, for example, according to the exampled components specified, professions class 46, tool types' class 47 and material types class 48, as illustrated in FIG. 4.

According to embodiments of the present invention, once the user selects a class component, the set of instance components relating to the selected class may be presented. For example, the user may open the material type's class 48, where the available material types class 48 are—maps, napkins, dishes and chandeliers. The user may select, for example, the dishes type class; upon selecting the dishes types, a set of instance components of dishes (in the specific materials 44 for example) may open.

Additionally, the system may be set to replace the class component with an instance component under predefined conditions. For example, if the user drags an instance component and places it on a class component that is not associated with the instance component (e.g. "David Green Plumber" that is only associated with the class of Plumbing placed upon a participant class of "Chefs") the system may either not accept the replacement or accept the icon of the instance component while leaving the icon of the former class component (e.g. "David the Plumber" may be displayed at the "Chefs" class but the class title may still be displayed).

Additionally, an instance component may be associated with more than one class. For example, a participant may he associated with more than one profession: e.g. a participant who is a carpenter as well as a plumber may be associated to various types of classes definitions or titles.

The action class 45 may be considered class since it may define the event 110 as a whole and may automatically open an event 110 upon selecting an action class 45. According to embodiments of the present invention, each option in the event class 45 may comprise at least some of the other components of an event 110.

Additionally, once a user has created a scenario 60 and stores the scenario in a shared database (through a website, for example)—all the instance components may automatically be replaced by classes components that are associated with the instance components to allow other users to customize the shared scenario while still using the scenario's template classes and features according to their own needs. For example, a user may save his/her own wedding scenario as a shared scenario where all the instance components such as the specific catering services, DJ, guests list and the like are automatically replaced by the classes of "Catering service", "DJ" etc. In this way, other users who are planning a wedding may use the events 110 and the events' components regardless of the specific instances of the user who created or modified the original scenario 60.

Additionally, once the user drags an action 111 from the library controller 134 all classes related to the associated action 111 may automatically be defined for the event 110.

According to some embodiments of the present invention, to be promoted at least one of the vendors and/or services providers of a template scenario 60, a template event 110 or the library controller's 134 components' options—a supplier of the materials, commodity and/or service may register as a specific participant using a GUI 10 option. The GUI 10 options may allow the suppliers to electronically register to the databases 20 through a website, where registration may require payment.

Additionally, once the user selects a supplier, a vendor, a services' provider or any other registered participant 114, the system may automatically notify the participant 114 regarding the user's selection enabling the supplier to contact the user by, for example, automatically opening a message box that allows the participant to send an automatic message that comprises the participant's 114 details to the user. The participant 114 may define and set the message's details upon registering to the system and may additionally be allowed to update this message through the system.

According to some embodiments of the present invention, the GUI 10 may allow presenting the scenario-flow according to event-components—additionally to allowing presentation according to events 110. For example, presenting a scenario-flow 100 of the participants 114 component. According to this example, the events 110 that do not comprise a filled component of participants 114—may not be indicated in this presentation of the scenario-flow.

Figure 5:
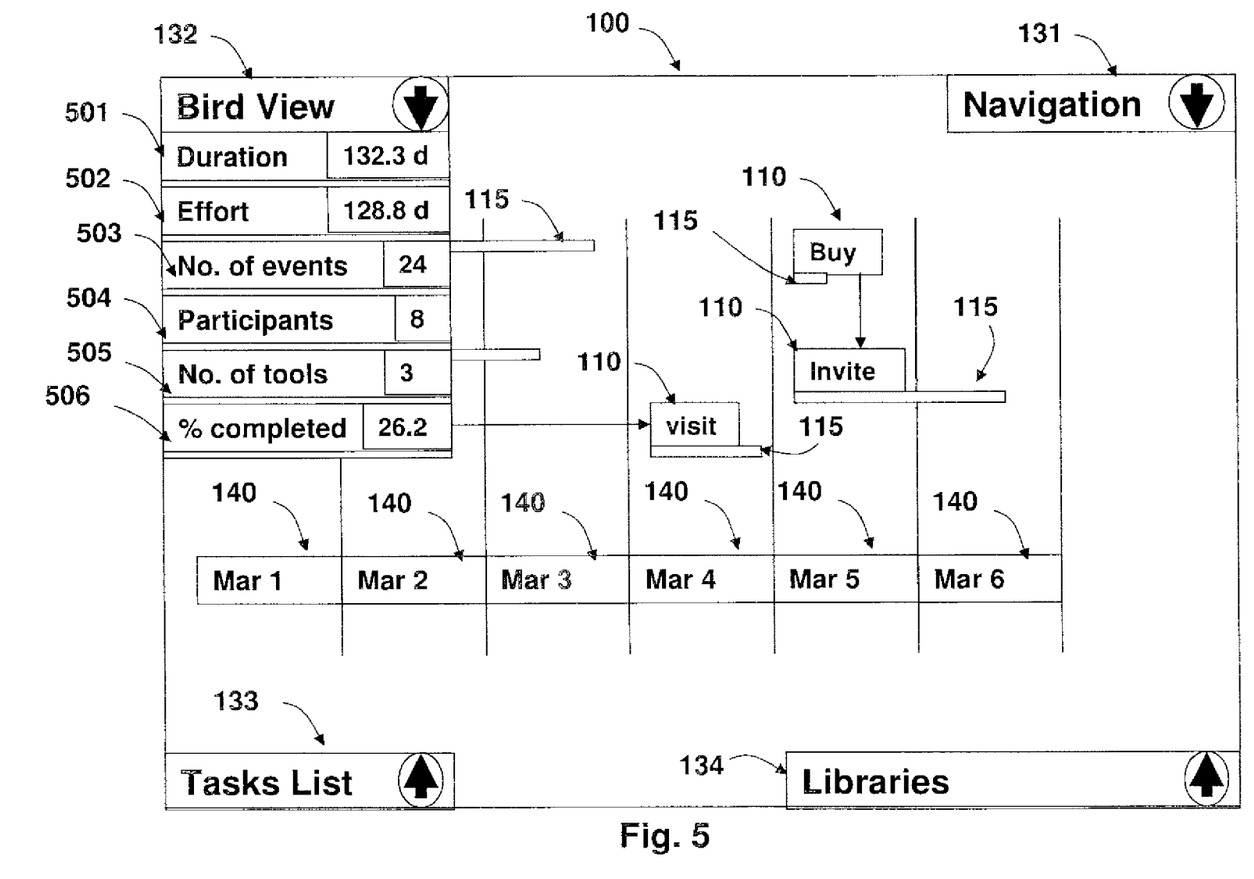
FIG. 5 is a schematic illustration of a bird view controller, according to some embodiments of the present invention.

FIG. 5 schematically illustrates the bird view controller 132, according to some embodiments of the present invention. The bird view controller 132 may allow the user to view the following parameters, for example:

the total duration 501 of the scenario 60;
the total effort 502 of the scenario 60—meaning the expected time spending or days required to fulfill the total events of the scenario 60;
the total number of events 503;
the total number of participants 504;
the total number of tools 505;
the accomplishment status 506 for example, the percentages of events that have been accomplished up to the current view or update.

According to embodiments of the present invention, the software application 101 may enable users to create template scenarios 60 that may be saved in the database 20 to enable sharing of template scenarios 60 among a multiplicity of users.

According to some embodiments of the invention, the dynamic module 12 of GUI 10 may enable the user to play the scenario 60 and represent the flow of the scenario in a dynamic presentation of a movie-view.

According to some embodiments of the present invention, the application 101 may allow the user to make changes and correction in events components' content, in events position along the timeframe and in the duration of the events 110. These changes may be viewed in a dynamic presentation of the scenario 60, where a movie view of the events 110 ascribed to the scenario 60 may be presented by showing the events 110 on the screen according to the chronological sequence of their positioning over the timeframe, in this way, the user may be able to better view and grasp the consequences of changing at least one events' position, existence or components over the entire scenario 60 and final results of events' sequence and accomplishment. The movie vie may be utilized by entering the dynamic module 12 option in the GUI 10. Viewing the dynamic presentation of changes may be defined by the system as a "simulation view" that may enable the user to view the outcome of the changes in the overall scenario 60.

According to some embodiments of the present invention, the system may allow the user associate notifications to events, according to execution parameters. For example, one a certain event 110 is over due the system may automatically transmit an Email message to the user's Email address, where the message's content, the user's address or both may be pre-updated in the system. Additionally, the user may receive automated SMS messages from the system as notification alarms.

According to embodiments of the present invention, the system may further enable the user to view a simulation of the scenario 60, where the simulation may present the chronological sequence of the scenario's 60 events 110 in a movie view. The simulations movie view may run the scenario 60 as a movie-view along shrank timescale that may be proportional to the real timescale, where the events 110 may appear on the simulation screen 12 and notifications may simulated according to the system's predefinitions. For example, the simulation may enable to produce participants' 114 situations and responses or notification messages to the situations. For example, a shortage of supply of one of the input materials 117 that may be simulated and a notification message automatically issued to the user's terminal 50 once the situation is identified.

Figure 6:
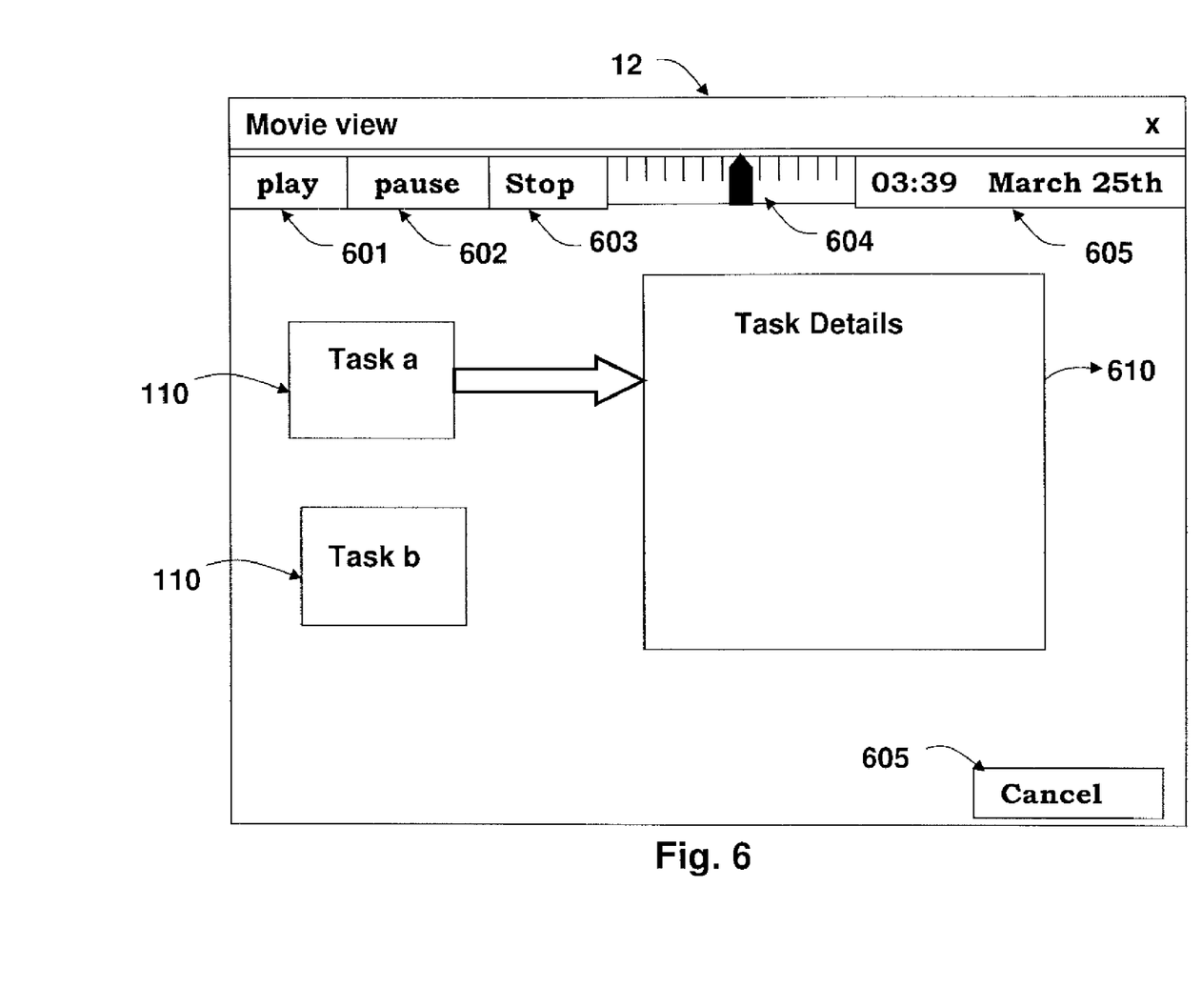
FIG. 6 is a schematic illustration of a movie run, according to some embodiments of the present invention.

Additionally, the simulation option may allow the user to edit the events 110 when pausing the movie-view of the movie view, as illustrated in FIG. 6. The dynamic module's 12 simulation may include the options for playing, pausing, stopping and navigating the scenario 60 movie using play 601, pause 602 and stop 603 buttons and a navigating ruler 604, for example. Additionally, a timing display 605 may be exhibited to indicate the date and hours set for the displayed events 110. To edit the events 110—an editing window 610 may be available displaying the event's details such as the event's components—allowing the user to make changes in those components and details. Additionally, the user may cancel 605 the event and remove the event from the scenario's 60 sequence.

Figure 7:
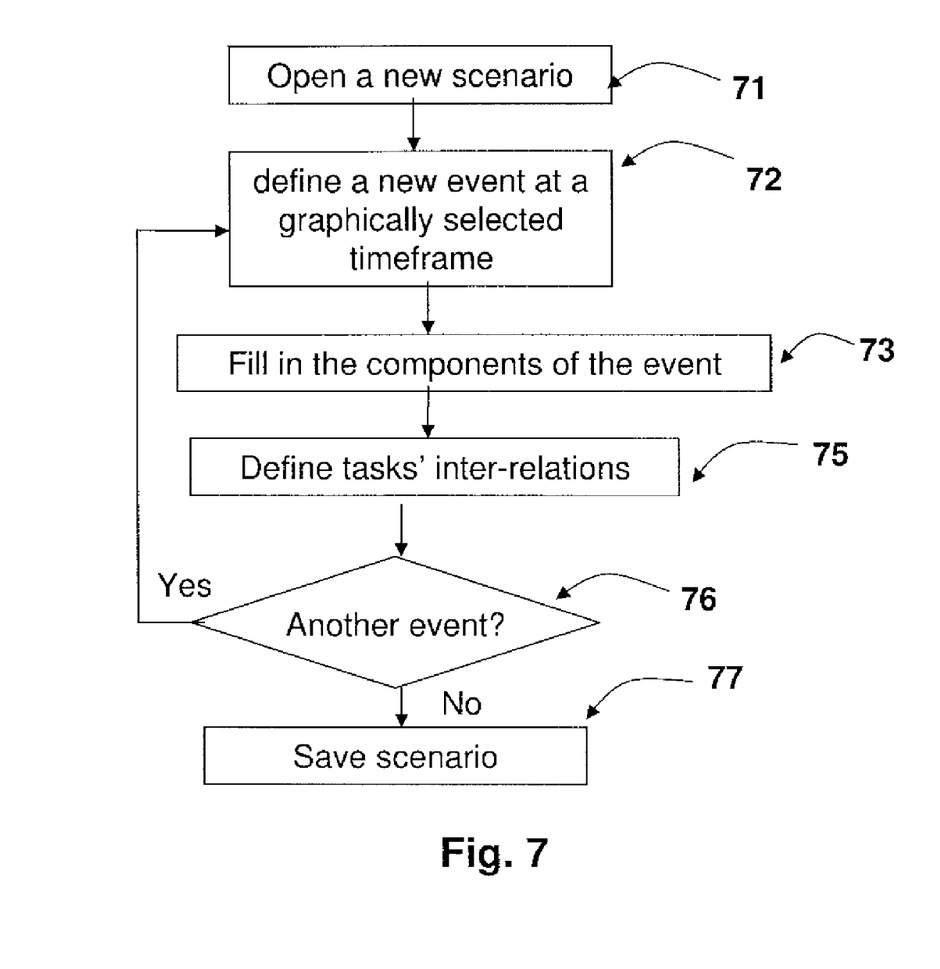
FIG. 7 is a flowchart that schematically illustrates a process of creating of a new scenario, according to some embodiments of the present invention.

FIG. 7 is a flowchart that schematically illustrates a process of creating a new scenario 60, according to some embodiments of the present invention. The process may represent a method for creating a scenario 60 using the software application 101, according to embodiments of the present invention. The process may comprise the steps of:

- opening a new scenario 71 using the GUI 10 options;
- graphically defining a new event 72 where the defining of the event 110 within the timeframe may allow the user to graphically open an event 110;
- filling in the events' components 73 where the user may fill up some of the components (such as participants 114, tools 113, in/output materials 117, 116, info-links 125 etc.) by selecting at least some of the chosen features out of preset lists of components' features;
- define event's 110 inter-relations 75 where the inter-relation between the events 110 may be defined by the system according to the user's graphical definitions and placements;
- once a event 110 is closed the user may select another position (which may be the same timing position of an already created event 110) to create another event 76 by repeating steps 72-75;
- closing the event 77 where once the user has filled all the desired components and details—the user may close the event 110 and automatically save it at the graphically selected timing position;
- saving the scenario 79 comprising the scenario 60 of the events 110—meaning the events and the events' sequence within the timeframe.

Figure 8:
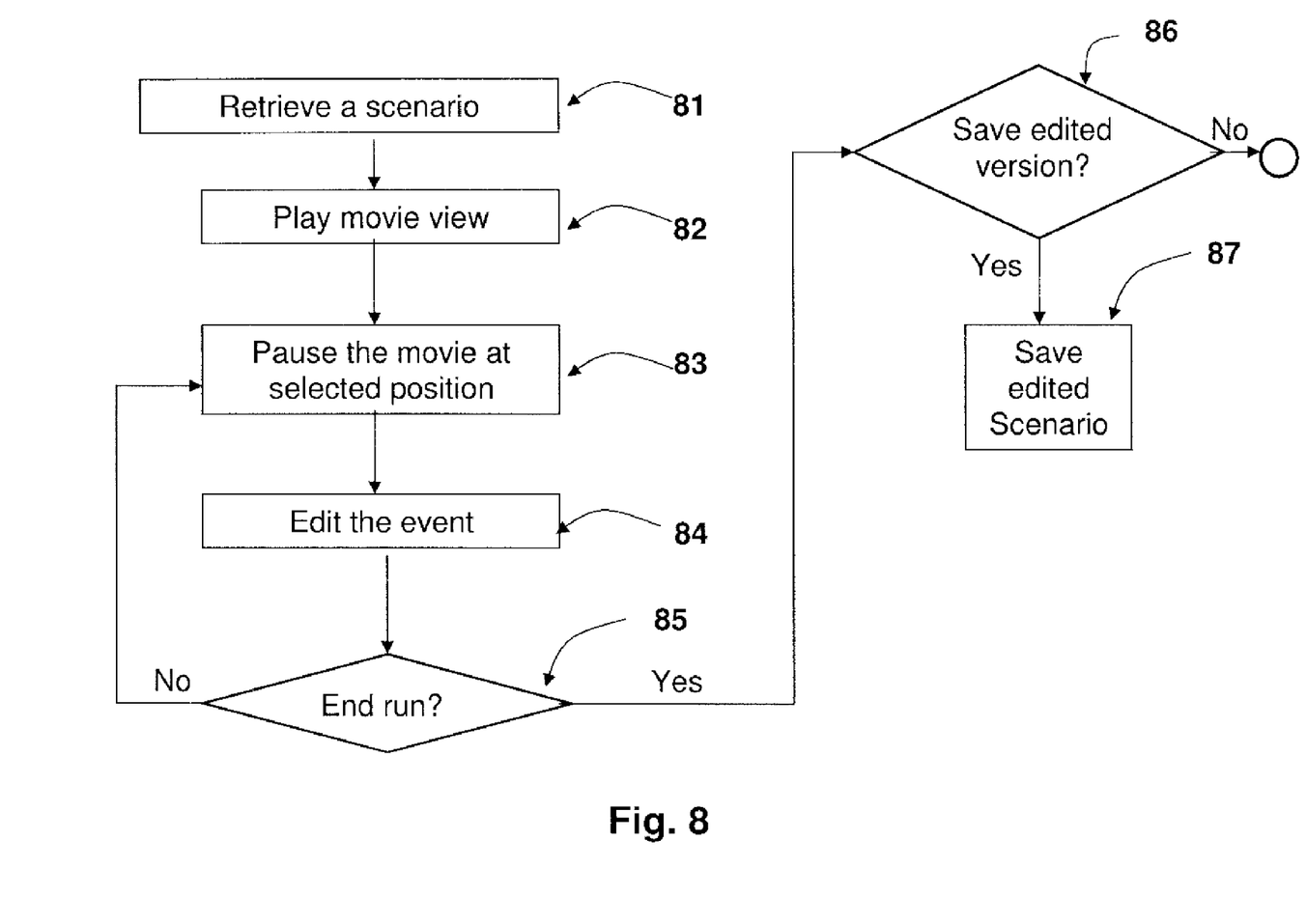
FIG. 8 is a flowchart that schematically illustrates a process of using the movie view to simulate editorial changes in the events of a scenario, according to some embodiments of the present invention.

FIG. 8 is a flowchart that schematically illustrates a process of using the movie view to simulate editorial changes in the events of a scenario 60, using the dynamic module 12, according to some embodiments of the present invention. The simulation and editing process may comprise the steps of:

- retrieving a scenario 81 where the user may use the dynamic module's 12 interface to retrieve a scenario file from the database 20;
- once the scenario file is retrieved—the dynamic module 12 may play the movie view 82 of the scenario 60;
- pausing the movie view 83—where once the user pauses the dynamic presentation of the scenario 60 (the movie view) an editing window 610 may be displayed;
- editing the event 84—where the editing window 610 may allow the user to edit, cancel and compose any available changes in the event 110 or events 110 positioned at the pausing position;
- once the user chooses to play the movie on 85 steps 83-84 may be repeated;
- once the final event 110 has been edited, the user may be enabled 86 to save the changes created in the edited and changed scenario 87;

Additionally, the GUI 10 may allow dynamically presenting the scenario 60 by only playing a movie view of the events 110 presented according to the chronological sequence of the events' positioning in the timeframe, without the editing optional feature.

According to some embodiments of the present invention, the GUI 10 may allow the user to view a dynamic presentation of a scenario 60 according to a single component—meaning to view a dynamic flow of only the events that comprise the selected component according to the events' sequence in the timeframe.

Figure 9:
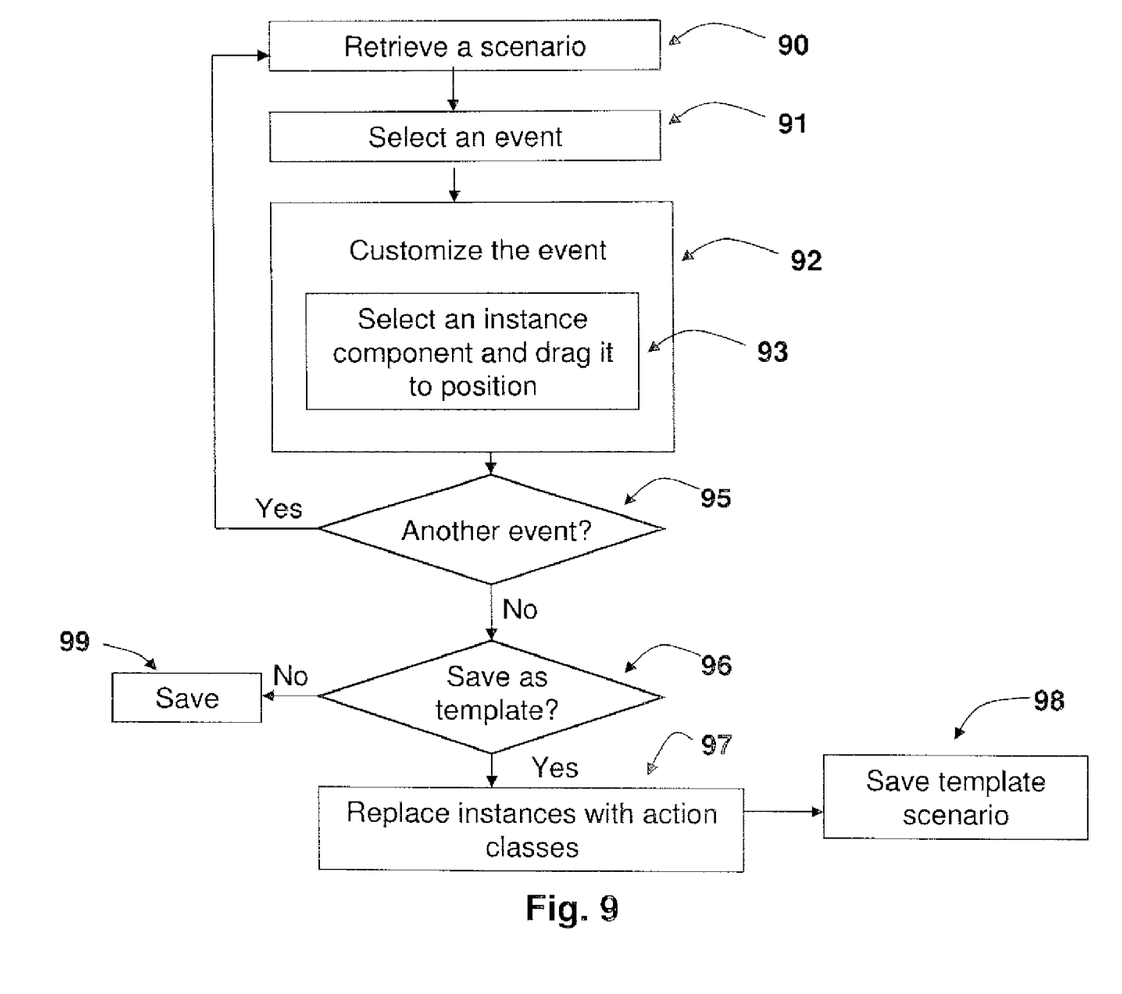
FIG. 9 is a flowchart that schematically illustrates a process of customizing a template scenario, according to some embodiments of the present invention.

FIG. 9 is a flowchart that schematically illustrates a process of customizing a template scenario 60, according to some embodiments of the present invention. The process may comprise the following steps:

- retrieving a scenario 90 horn the database 20 and/or any other source of template scenarios 60;
- selecting an event 91, where the user may select a template event 110 out of the template scenario 60 by any means known in the art: for example, by double clicking upon the even 110 icon;
- once the user selects the event 110, the user may customize the event 92 by, for example, selecting at least one instance component 93 from the libraries controller 134 and dragging it to the right component in the task (where once the instance component is placed upon the component in the design board—the system may automatically replace the class component with the instance one if the instance is associated with the class); and/or dragging the event 110 (in case of a template event 110) to a new timing position, where the user may reschedule the event in relation to the timeframe and in relation to other events 110;
- if the user wishes to customize additional events 95 the same procedures may be substantially repeated;
- once the user completed the customization, if the user wishes to enable other user to share the customized scenario 96 the user may select a saving option that allows saving the scenario 60 as a template;
- the template nay be saved 98 by the system by automatically replacing 97 all the instance components of all the events 110 of the scenario 60 with their associated and/or original (in the first template) action classes components;
- the user may save the scenario 99 not as a template including all instances.

According to some embodiments of the present invention, since the system allows participants 114 as well as users to register and/or advertise their services, commodities and the like, using the template scenarios 60 or the instance/class definitions—the system may further allow commerce of template scenarios 60. For example, a production company that may sell its services and connections through production scenarios 60 fit to specific projects.

According to some embodiments of the present invention, the system may support the actual execution of the scenario 60 by the user by allowing communicating with several devices of the user, for example. The server 40 may allow communication, for example, with the user's mobile phone and enable transmitting short messaging service (SMS) messages to notify the user regarding an approaching deadline of an event 110 and the like. Additionally, the system may allow participants or users to transmit messages to the server 40 to update statuses of events 100. For example, the user may send an SMS message to the server 40 to update a completion of a certain event 110 in the scenario 60, using predefined coding such as, for example: "e2s100" which may be translated by the system to "second event is completed". The message, received by the server 40 may identify the user by identification of the user's device that may be stored in the shared database 50. The system may automatically update the user's scenario 60 according to the message by reading the message according to the predefined coding.

According to some embodiments of the invention, the system may further allow presenting, executing and editing of a multiplicity of scenarios 60 displayed and ran where at least some of the scenarios 60 events' 110 schedules overlap.

Figure 10:
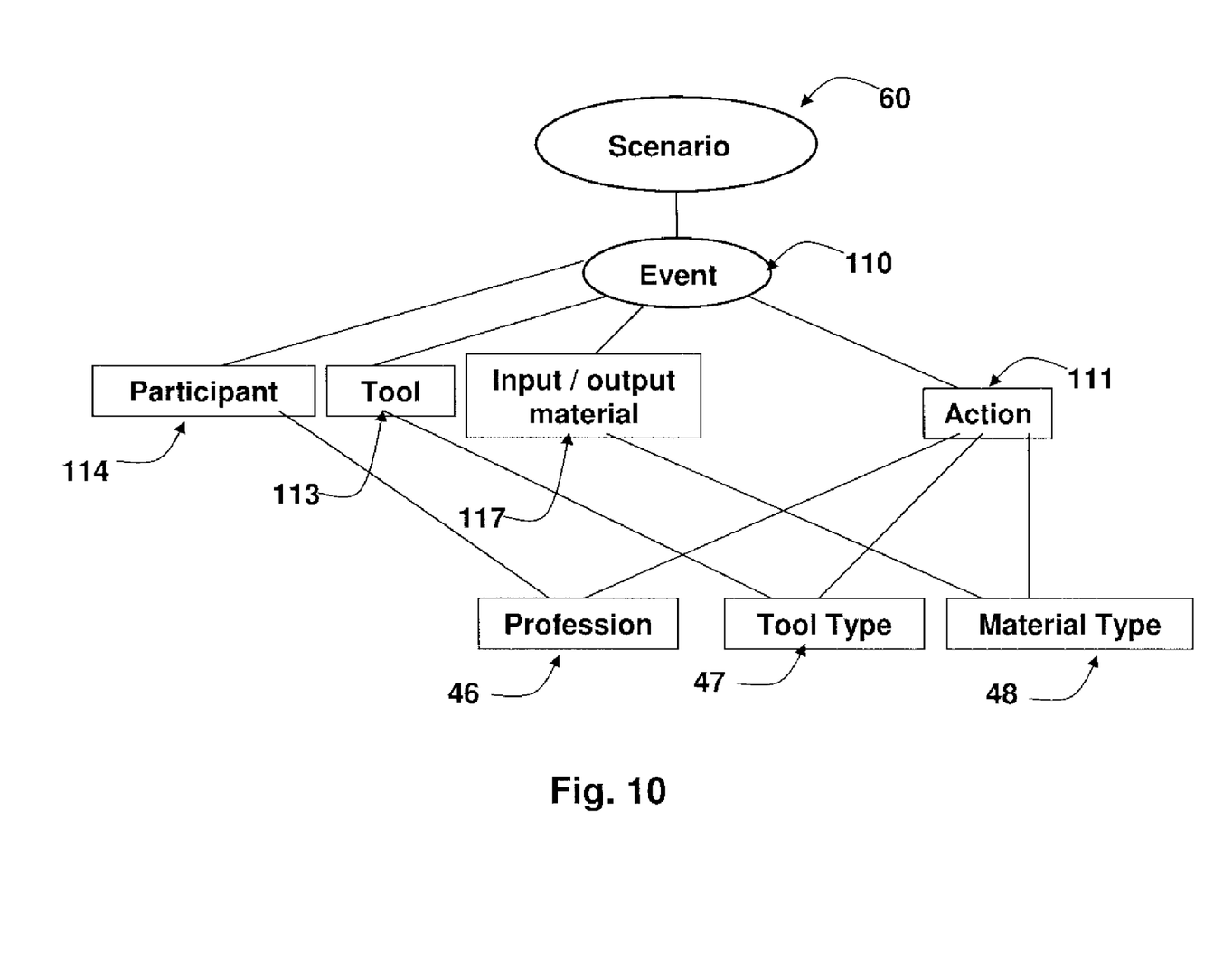
FIG. 10 is a schematic illustration of the linkage between the scenario's events and the components, according to some embodiments of the present invention.

FIG. 10 is a schematic illustration of the linkages between the scenario's 60 events 110 and the components of the events defined under the actions 111, according to some embodiments of the present invention. Each event 110 may be associated with at least one action 100. Each action 111 may be associated with classes such as: participant 114, toot 113 and input/output materials 117, where each class may be associated with at least one instance. For example, the participants 114 may be linked to at least one profession 46 where a list of service providers as professional people and/or companies 46 instances may be linked to the professions 46 enabling the user to view and select all registered service providers.

Additionally, the system may accept and present completion reports as welt as progress notifications notifying the user regarding the execution status of at least some of the events 100 of the scenario 60. The users as well as the participants may fill progress reports updating the system regarding the actual status of the scenario 60.

Additionally, once an event 110 is over due—the system may automatically reschedule all uncompleted events of scenario 110. The notification messages as well as the reports may be transmitted to/from the user's terminal 50.

While the invention has been described with respect to a limited number of embodiments, these should not be construed as limitations on the scope of the invention, but rather as exemplifications of some of the preferred embodiments. Those skilled in the art will envision other possible variations, modifications, and applications that are also within the scope of the invention. Accordingly, the scope of the invention should not be limited by what has thus far been described, but by the appended claims and their legal equivalents.

What is claimed is:

1. A system for designing, executing, reusing and customizing scenarios by defining sequential events, wherein each event comprises at least one component and each component is associated with at least one class, said system comprising:
   at least one database that comprises class components, instances components and scenario related information, wherein each class component define generic type of instance components and each instance is associated with at least one class component;
   a GUI that allows a user to design a scenario by defining at least one event, selecting at least one of: class components and instance components for each event, and placing each said event within a specific location along a timeline, wherein the assignment is achieved by moving graphic objects over a design board within the timeline, wherein the dependencies between the events are defined according to their position along the timeline and can be changed by graphically changing their position along the timeline;
   a processor for
      running the scenario;
      associating said events with one another and defining interrelations between at least part of the events, and
      identifying class and instance components for each event of said scenario;
   wherein said system enables creating reusable generic template scenarios, based on user's created scenarios comprising predefined events and predefined interrelations between said events by automatically replacing all instance components of each event in a scenario with class components therewith, and customization of the reusable generic template scenarios by allowing the user to replace the template's class components with instance components and change positions of events along the timeline,
   wherein said GUI allows presenting of controllers, wherein said controllers are:
      bird view-that enables exhibiting scenario related parameters;
      navigator that allows the user to graphically navigate the scenario and the events associated with said scenario;
      events list, which is a list of all events associated with the scenario; and
      libraries, which is at least one list of instance components and at least one list of class components that allow the user to define and select said instance and class components, and the definition of the relation between said components wherein upon selecting a feature or a component, and placing them in the timeline, a new event is automatically created, said libraries controller including drag-and-drop options that allow the user to select instance and class components and drag said component to the design board,
   wherein said instance components define services and commodities of physical and virtual objects relating to an external service provider which include human and virtual entities that are registered in the system, wherein upon the user's selecting an instance component during a planning phase of the scenario component relating to a service provider to customize an event, the system automatically notifies said service provider allowing said service provider to contact said user, wherein the notification is taking place during the planning phase.

2. The system of claim 1 further comprising a dynamic module enabling dynamic presentation of a movie-view of scenarios, associated events and the events' components defined by the operation module, wherein said dynamic module enables presenting of events and associated images according to the chronological sequence of the scenario's events and synchronized with the date and time.

3. The system of claim 1, further comprising a static module which allows presenting of a scenario-flow over a design board, which is a graphical presentation of at least some of the events associated with said scenario according to the chronological sequence of said events, within the scenario.

4. The system of claim 3 wherein the static module allows presentation of the scenario-flow according to a selected component, by only presenting the events of the scenario that include said selected component.

5. The system of claim 1 wherein said system is a software application associated with a web server connected to said database to enable a plurality of users to share a plurality of scenarios and events, as well as a plurality of events' instance and class components.

6. The system of claim 5 wherein the GUI allows the user to download template scenarios associated with template scenarios, wherein said templates are downloaded from said database.

7. The system of claim 5 wherein said server enables communicating with at least one user's terminal through at least one communication network, wherein said terminals enables using the application's GUI options as well as receiving of notification messages from said server.

8. The system of claim 5 wherein said system further supports the actual execution of the scenario by the user, allowing communicating with at least one user's terminal, wherein said server enables transmitting messages to the users and participants of a respective event to notify the user regarding events statuses and receiving progress and completion reports from and to the user's terminal.

9. The system of claim 8 wherein said server further enables receiving messages from users and updating users' events and scenarios according to the users' messages, wherein said messages are written and sent according to a predefined coding.

10. The system of claim 1 wherein said instance and class components are: at least one action, participants, tools, input materials and output materials.

11. The system of claim 1 wherein said system further allows the user to run a simulation of the scenario, where the user is enabled to edit and make changes in the scenario, the scenario's events and components using the static presentation module and then view the changed scenario in a movie view using the dynamic presentation module.

12. The system of claim 1 wherein said system further enables the user to retrieve, edit and view template scenarios, wherein each template scenario comprises template events that include template class components.

13. The system of claim 1 further enabling rescheduling of events when the user is selecting an instance according to resources availability by checking event's resources availability in comparison to event assignment along the time line.

* * * * *